United States Patent
Engstrom et al.

(10) Patent No.: US 10,710,439 B1
(45) Date of Patent: Jul. 14, 2020

(54) GLASS RUN CHANNEL WITH INTEGRAL LEAP SEAL PORTION FOR ENGAGING WINDOW MOLDING

(71) Applicant: Toyota Motor Engineering & Manufacturing North America, Inc., Plano, TX (US)

(72) Inventors: Peter J. Engstrom, Howell, MI (US); Hideaki Kanasugi, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/272,253

(22) Filed: Feb. 11, 2019

(51) Int. Cl.
*B60J 10/76* (2016.01)
*B60J 10/50* (2016.01)
*B60J 5/04* (2006.01)
*B60J 10/277* (2016.01)
*B60R 13/02* (2006.01)

(52) U.S. Cl.
CPC .............. *B60J 10/76* (2016.02); *B60J 5/0402* (2013.01); *B60J 10/50* (2016.02); *B60J 10/277* (2016.02); *B60R 13/0243* (2013.01)

(58) Field of Classification Search
CPC ........... B60J 10/50; B60J 10/76; B60J 5/0402
See application file for complete search history.

(56) References Cited

U.S. PATENT DOCUMENTS

| | | | | |
|---|---|---|---|---|
| 2,994,555 A | * | 8/1961 | McClure | B60J 10/76 49/440 |
| 4,653,801 A | * | 3/1987 | Shirasu | B60R 13/06 296/202 |
| 5,107,624 A | * | 4/1992 | Passone | B60J 5/0402 49/502 |
| 5,163,248 A | * | 11/1992 | Bielis | B60J 10/84 49/441 |
| 7,325,859 B1 | * | 2/2008 | Brancaleone | B60J 5/0402 296/146.9 |
| 7,571,569 B2 | * | 8/2009 | Hiramatsu | B60J 10/21 49/441 |
| 8,104,229 B2 | * | 1/2012 | Minami | B60J 10/277 49/441 |
| 8,128,143 B2 | | 3/2012 | Zimmer et al. | |
| 8,646,213 B2 | | 2/2014 | Suzuki | |
| 8,689,489 B2 | | 4/2014 | Mine | |
| 8,764,099 B2 | * | 7/2014 | Suzuki | B60J 5/0455 296/146.2 |
| 8,978,306 B2 | * | 3/2015 | Prater | B60J 10/265 49/440 |

(Continued)

FOREIGN PATENT DOCUMENTS

DE 102008041970 A1 4/2010

*Primary Examiner* — Catherine A Kelly
(74) *Attorney, Agent, or Firm* — Christopher G. Darrow; Darrow Mustafa PC

(57) ABSTRACT

A glass run channel is configured for mounting a vehicle window therein. The glass run channel includes a base portion, an inboard lip extending from the base portion to form a first wall of the channel, and an inboard glass seal portion extending from the inboard lip. A leap seal portion extends from one of the inboard lip and the inboard glass seal portion, along at least a portion of the glass run channel.

6 Claims, 3 Drawing Sheets

(56) References Cited

U.S. PATENT DOCUMENTS

| | | | | |
|---|---|---|---|---|
| 9,027,982 | B2* | 5/2015 | Ide | B60J 5/0402 |
| | | | | 296/146.2 |
| 9,079,480 | B1* | 7/2015 | Williams | B60J 5/0402 |
| 9,114,693 | B2* | 8/2015 | Prater | B60J 10/88 |
| 9,845,001 | B1* | 12/2017 | Kojima | B60J 10/76 |
| 2005/0120633 | A1* | 6/2005 | Takase | F16J 15/025 |
| | | | | 49/441 |
| 2006/0021281 | A1* | 2/2006 | Tamaoki | B60J 10/265 |
| | | | | 49/441 |
| 2009/0064592 | A1* | 3/2009 | Takase | B60J 10/277 |
| | | | | 49/374 |
| 2017/0129318 | A1* | 5/2017 | Uemura | B60J 10/76 |
| 2017/0291480 | A1* | 10/2017 | Kameoka | B60J 10/26 |
| 2018/0290526 | A1* | 10/2018 | Nishikawa | B60J 10/18 |
| 2019/0193541 | A1* | 6/2019 | Takeda | B60J 10/88 |
| 2019/0193542 | A1* | 6/2019 | Prodoni | B60J 10/265 |
| 2019/0299755 | A1* | 10/2019 | Fujita | B60J 5/0402 |

\* cited by examiner

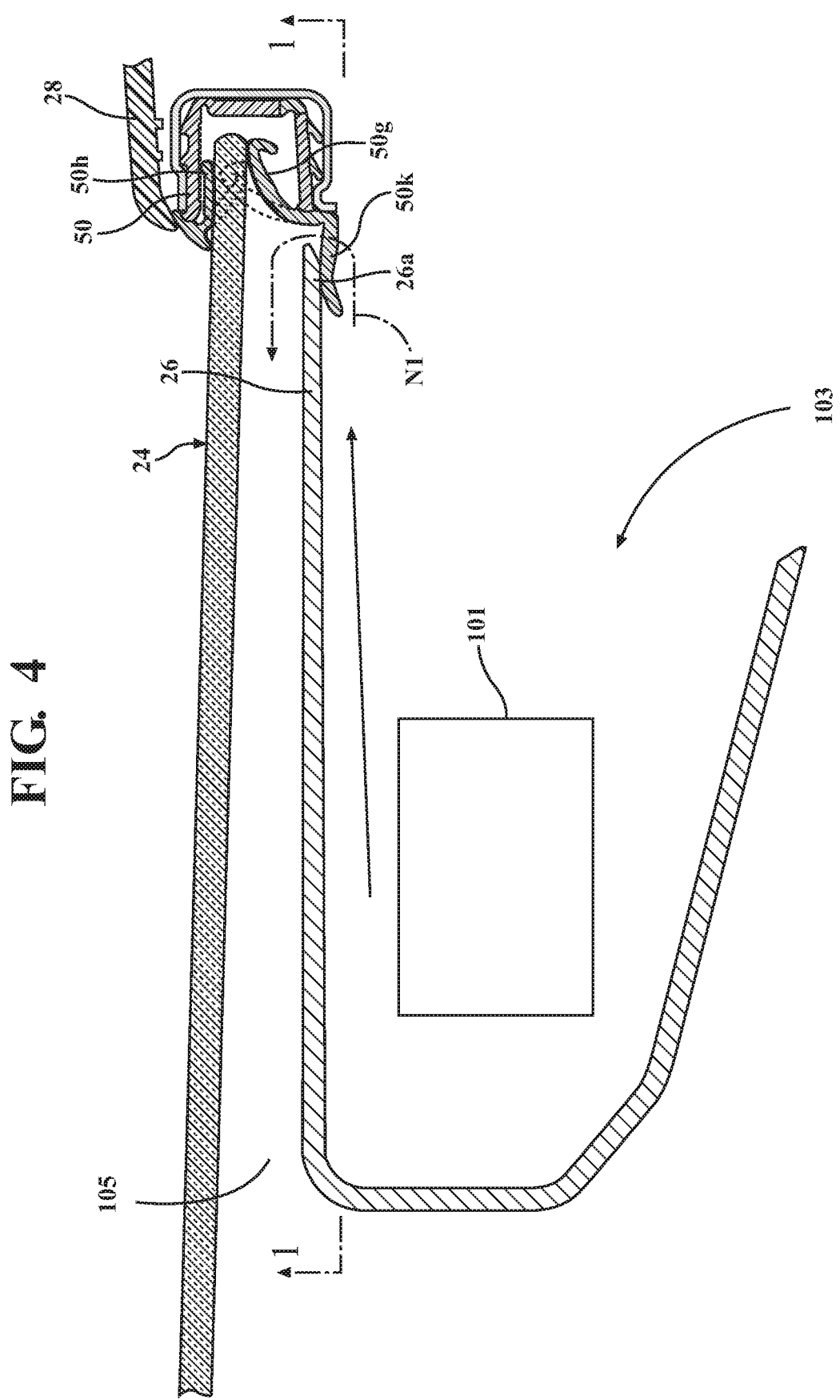

GLASS RUN CHANNEL WITH INTEGRAL LEAP SEAL PORTION FOR ENGAGING WINDOW MOLDING

TECHNICAL FIELD

The present invention relates to seals for vehicle windows and, more particularly, to a seal mountable in a glass run channel used for mounting a window to a vehicle door, to aid in preventing noise from an interior of the vehicle door from entering a vehicle occupant compartment.

BACKGROUND

A glass run channel may be mounted along a window-receiving cavity formed in a vehicle door. The glass run channel may include features which resiliently contact the window glass to form one or more seals which help prevent wind, noise, moisture, etc. from migrating from an exterior of the vehicle into the occupant compartment. However, road noise, wind and any other noise from outside the vehicle may pass through the outer panel of the door and into the door interior. This noise may then travel into the vehicle occupant compartment through any open sound paths available. In addition, mechanisms inside the vehicle door may also produce noise that may enter the occupant compartment. For example, in a vehicle sliding door, a pulley mechanism may be housed inside the door to aid in automatically opening and closing the door. This mechanism generates noise that may enter the occupant compartment through openings in the door structure.

SUMMARY

In one aspect of the embodiments described herein, a glass run channel is configured for mounting a vehicle window therein. The glass run channel includes a base portion, an inboard lip extending from the base portion to form a first wall of the channel, and an inboard glass seal portion extending from the inboard lip. A leap seal portion extends from one of the inboard lip and the inboard glass seal portion, along at least a portion of the glass run channel.

In another aspect of the embodiments described herein, a vehicle door assembly includes a window-receiving cavity configured for mounting a piece of window glass therein. A window molding is mounted adjacent the window-receiving cavity. A glass run channel is mounted in the window-receiving cavity. The glass run channel includes a leap seal portion extending therefrom. A piece of window glass has a portion received in the glass run channel. An edge portion of the window molding resides between the leap seal portion and the piece of window glass, and the edge portion of the window molding is in contact with the leap seal portion.

BRIEF DESCRIPTION OF THE DRAWINGS

FIG. 4 is a schematic partial plan view of a portion of the vehicle door assembly shown in FIG. 1, illustrating a portion of an interior of the door and operation of the leap seal portion to obstruct a noise path from an interior of the vehicle door.

DETAILED DESCRIPTION

Embodiments described herein relate to a glass run channel mountable along a window-receiving cavity formed in a vehicle door. The glass run channel includes a base portion and an inboard lip extending from the base portion to form a first wall of the channel. An inboard glass seal portion extends from the inboard lip, and a leap seal portion extends from one of the inboard lip and the inboard glass seal portion, along at least a portion of the glass run channel. The leap seal portion is configured to contact a window molding, to bridge a gap between the glass run channel and the window molding which may otherwise provide a migration path for noise generated within the vehicle door. In addition, the leap seal is configured so that the portion of the window molding contacted by the leap seal resides between the leap seal and a piece of window glass mounted in the glass run channel. Thus, the leap seal resides interior of the portion of the window molding contacted by the leap seal (i.e., the leap seal resides closer to the vehicle interior than the portion of the window molding).

Figure 1:
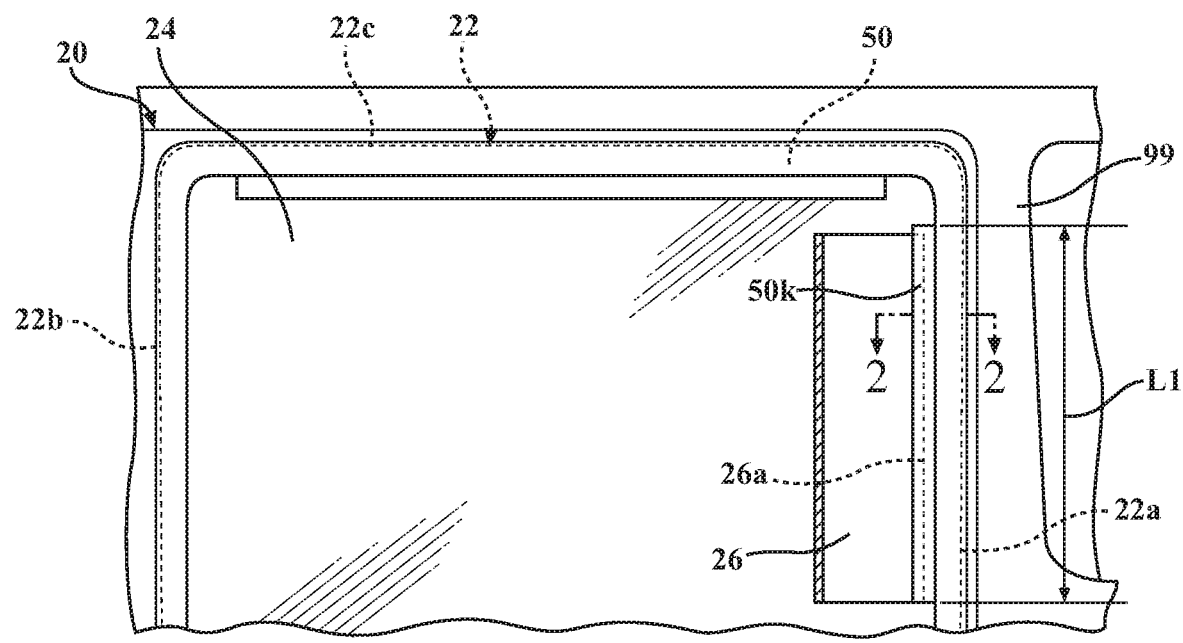
FIG. 1 is a schematic partial side view of a sliding vehicle door assembly incorporating a glass run channel in accordance with an embodiment described herein, viewed from the interior of the vehicle.

FIG. 1 is a schematic partial side view of a vehicle door assembly 20 incorporating a glass run channel 50 including a leap seal portion in accordance with embodiments described herein. As used herein, the term "door assembly" refers to the fully-assembled vehicle door and all of its constituent components.

The glass run channel 50 may be mounted inside a window frame 22 positioned within a recess in the door assembly 20. The glass run channel 50 may be configured to receive therein a portion of a piece of vehicle window glass 24 when the glass is mounted in the window frame 22. The glass run channel 50 may provide a seal along each side of the window glass 24 (i.e., along the inboard side of the glass facing the vehicle interior, and along the outboard side facing the exterior of the vehicle) to aid in preventing moisture, wind, sound, etc. from flowing around the edges of the window glass 24 and into the vehicle interior. The glass run channel 50 may be formed from a rubber, a plastic material, or any other material that is suitably flexible and resiliently deformable.

In the embodiments described herein, the vehicle door assembly 20 may be a sliding door assembly (such as mounted on a minivan, for example). However, an embodiment of the glass run channel described herein may also be incorporated into a swinging or rotating type of vehicle door assembly, or any other type of vehicle door assembly in which a window may be mounted.

The window frame 22 may include a first side portion 22a, a second side portion 22b opposite the first side portion 22a, and an upper portion 22c spanning the first and second side portions 22a and 22b. The glass run channel 50 may be formed as a single piece to extend continuously along the first side portion 22a, the upper portion 22c, and the second side portion 22b. The glass run channel 50 may also extend below the window frame first and second side portions 22a, 22b. In a sliding vehicle door, the window glass 24 may be statically mounted in the door assembly 20, so that the window glass 24 may not be raised or lowered within the structure of the door assembly 20.

Referring to the drawings, a window corner molding or garnish 26 formed from a rubber, polymeric, or other suitable material may extend adjacent a portion of the window-receiving cavity 52 on the interior side of the window glass 24. The window molding 26 may also incorporate a felt material. The window molding 26 may seal and/or cover a portion of an interior of the door assembly 20 (i.e., a region between inner and outer panels forming an interior of the door assembly). For example, in a vehicle sliding door, a portion of the window molding 26 positioned adjacent the glass run channel in the window frame may conceal from view a pulley mechanism 101 and/or other mechanisms housed inside the sliding door.

Figure 2:
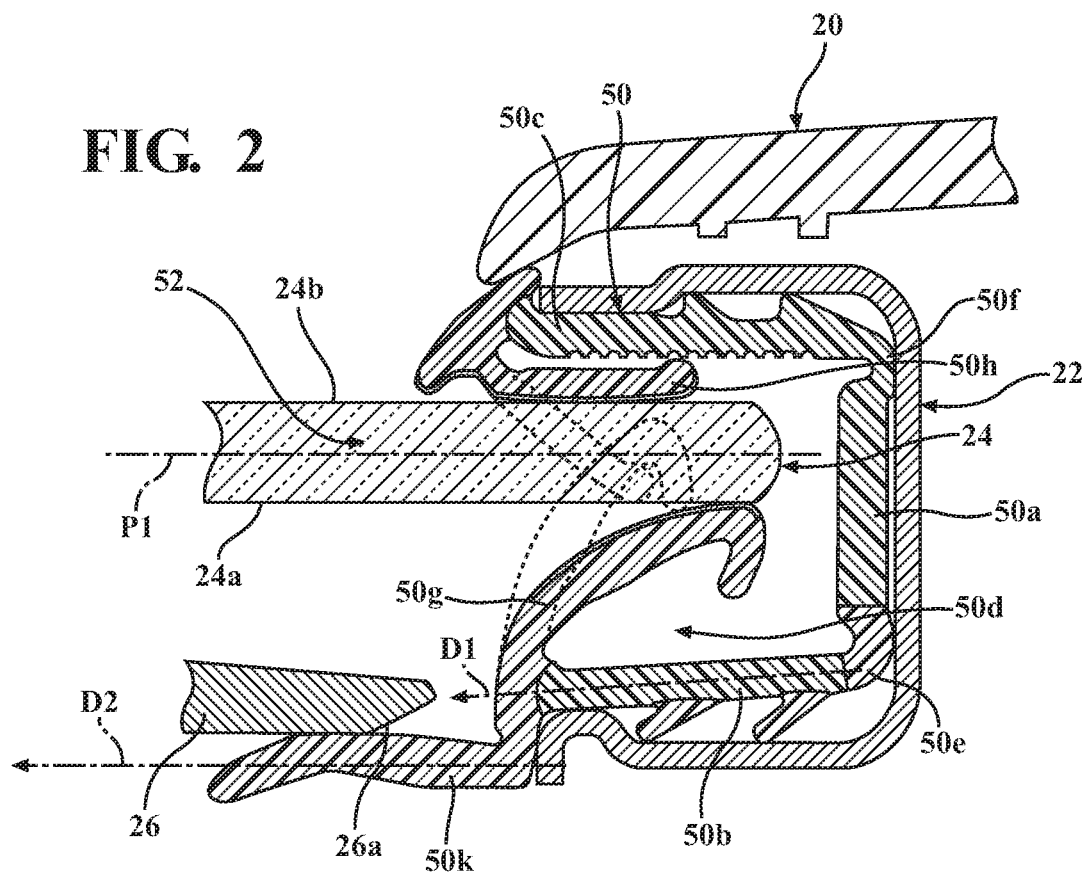
FIG. 2 is a schematic cross-sectional view of a portion of the glass run channel of the sliding door assembly of FIG. 1, showing a positioning of the leap seal portion such that an edge of a window garnish/corner molding resides between the leap seal portion and the window glass.

FIG. 2 is a schematic cross-sectional view showing a portion of a glass run channel 50 in accordance with an embodiment described herein incorporated into the vehicle door assembly 20. FIG. 2 also shows the window-receiving cavity 52 of the door assembly, with the window frame 22 and the glass run channel 50 secured in the window-receiving cavity 52. In addition, the window glass 24 is mounted in the window-receiving cavity 52, with a portion of the window glass 24 extending into the glass run channel 50.

Embodiments of the glass run channel 50 described herein may be formed in a known manner from a rubber, plastic, or any other suitable material. in one or more arrangements, and as used in conventional glass run channels, the glass run channel 50 material may be treated using a thermoplastic vulcanization (TPV) process. In another example, the glass run channel 50 may be formed from an EPDM (ethylene propylene diene monomer) rubber material. In yet another example, the glass run channel 50 may be formed from a thermoplastic olefin (TPO) material.

Referring to the drawings, and particularly to FIG. 2, a glass run channel 50 in accordance with embodiments described herein may include a base portion 50a, an inboard lip 50b, and an outboard lip 50c. The base portion 50a, the inboard lip 50b and the outboard lip 50c may combine to form a channel 50d configured for receiving a portion of a piece of vehicle window glass 24 therein.

The inboard lip 50b may extend from the base portion 50a to form a first wall of the channel 50d. The outboard lip 50c may extend from the base portion 50a opposite the inboard lip 50b to form a second wall of the channel extending opposite the first wall. A first transition region 50e having a relatively lower material thickness and/or stiffness may be provided between the base portion 50a and the inboard lip 50b, to facilitate bending of the inboard lip 50b with respect to the base portion 50a. Also, a second transition region 50f having a relatively lower material thickness and/or stiffness may be provided between the base portion 50a and the outboard lip 50c, to facilitate bending of the outboard lip 50c with respect to the base portion 50a.

In addition, an inboard glass seal portion 50g may extend from the inboard lip 50b in a direction toward the outboard lip 50c. Inboard glass seal portion 50g may be resiliently deformable and configured to contact an interior surface 24a of the window glass 24 as shown when the glass 24 is inserted into the channel 50d, thereby providing a resilient seal between the window glass 24 and the glass run channel 50. Also, an outboard glass seal portion 50h may extend from the outboard lip 50c in a direction toward the inboard lip 50b. Outboard glass seal portion 50h may be resiliently deformable and configured to contact an exterior surface 24b of the window glass 24 as shown when the glass 24 is inserted into the channel 50d, thereby providing another resilient seal between the window glass 24 and the glass run channel 50. FIG. 2 shows the inboard glass seal portion 50g and the outboard glass seal portion 50h in their non-deflected states (dashed lines) prior to insertion of the window glass 24 into the channel 50d, and also in their deflected states (solid lines) after insertion of the window glass 24 into the channel 50d.

Figure 3:
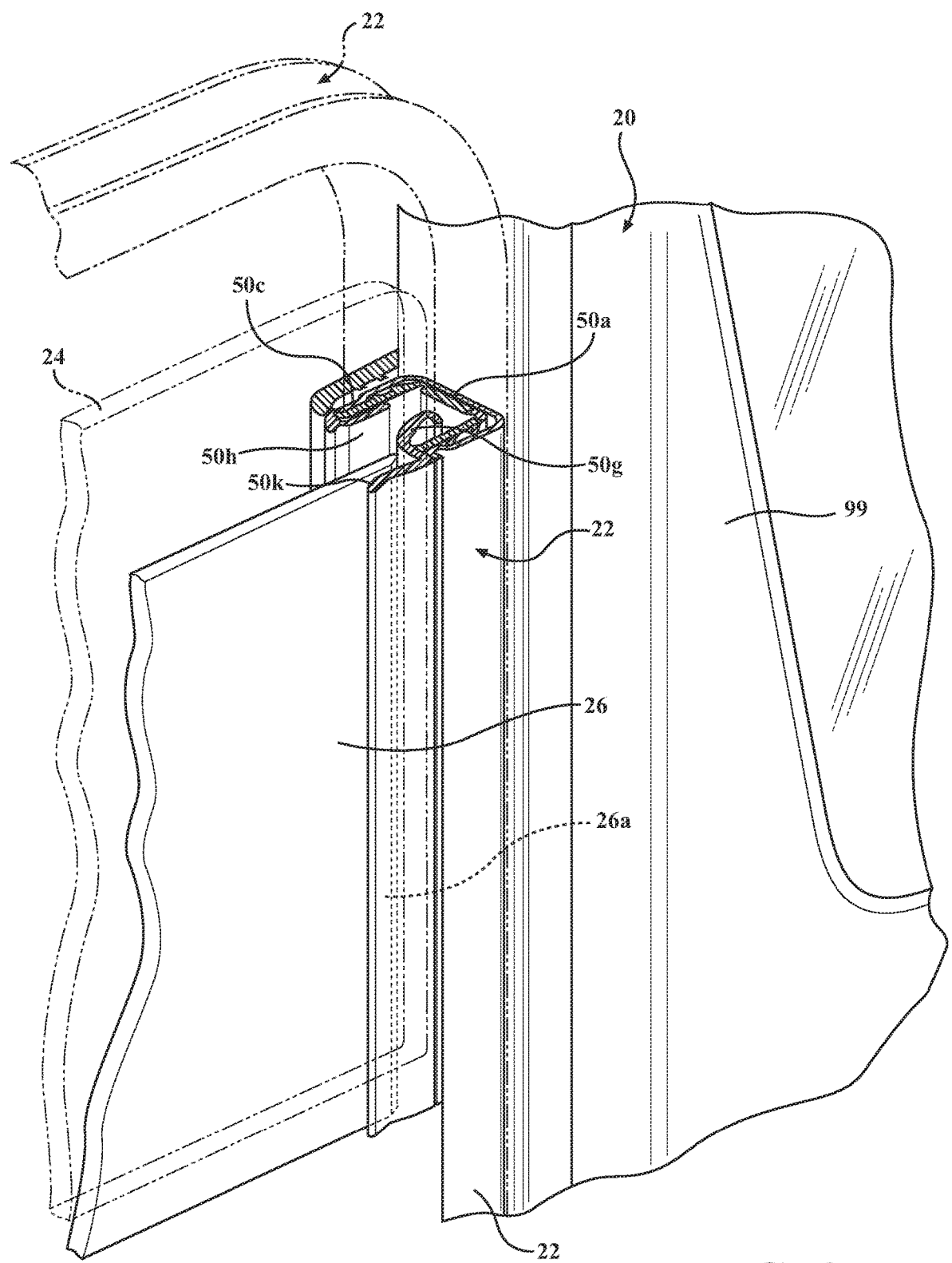
FIG. 3 is a schematic perspective partial cutaway view of a portion of the vehicle door assembly shown in FIG. 1, viewed from the interior of the vehicle.

Referring to FIGS. 2-4, the door interior mechanism 101 may generate noise during operation of the vehicle door assembly 20. In addition, wind, road noise generated by the tires, and any other noise from outside the vehicle may easily pass through the outer panel of the door and into the door interior 103, between the inner and outer door panels. This noise may echo and be magnified within the door interior 103. If not obstructed, noise from these sources may migrate from the door interior 103 to the vehicle occupant compartment 105, for example, along the path indicated by arrow N1 through a gap between the glass run channel 50 and the window molding 26. To obstruct this noise path, a leap seal portion 50k may be provided to extend from one of the inboard lip 50b and the inboard glass seal portion 50g, along at least a portion of the length of the glass run channel 50. Leap seal portion 50k may be formed as a single piece with the remainder of the glass run channel 50. In one or more arrangements, and as shown in FIG. 2, the inboard lip 50b may extend from the base portion 50a in a first direction D1 and the leap seal portion 50k may extend from the one of the inboard lip 50b and the inboard glass seal portion 50g in a direction D2 parallel or substantially parallel to the first direction D1. As used herein, the term "substantially" includes exactly the term it modifies and slight variations therefrom. Thus, the term "substantially parallel" means exactly parallel and slight variations therefrom. In this particular example, slight variations therefrom can include parallelism within a range of ±10° inclusive (i.e., an angle formed by an intersection of vertical planes including directions D1 and D2 may be up to and including 10°).

In one or more arrangements, and as shown in FIG. 2, the leap seal portion 50k may extend from the one of the inboard lip 50b and the inboard glass seal portion 50g in a direction D2 parallel or substantially parallel to a plane P1 of a piece of window glass received in the channel. In one or more arrangements, the leap seal portion 50k may extend from the one of the inboard lip 50b and the inboard glass seal portion 50g in a direction D2 parallel or substantially parallel to the outboard lip 50c or second wall of the channel. The shape and dimensions of the leap seal portion 50k and the direction in which the leap seal portion 50k extends from the one of the inboard lip 50b and the inboard glass seal portion 50g may depend on the spatial relationship between the glass run channel 50 and the window molding 26 for a particular door design, and also other pertinent factors.

In one or more arrangements, and as shown in the drawings, a portion of the glass run channel 50 may be mounted in a portion of the vehicle window frame 22 configured to reside adjacent a vehicle C-pillar 99 when the vehicle door assembly 20 is mounted on the vehicle and is in a closed condition (i.e., the door is "closed"). In such arrangements, the leap seal portion 50k of the glass run channel 50 may extend only along the portion L1 of the glass run channel 50 residing adjacent the vehicle C-pillar 99 when the vehicle door assembly 20 is in the closed condition.

Also, in embodiments described herein, and as seen in FIGS. 2 and 3, the leap seal portion 50k may be configured so that an edge portion 26a of the window molding 26 resides between the leap seal portion 50k and the piece of window glass 24. In addition, in embodiments described herein, the leap seal portion 50k engages or contacts the edge portion 26a of the window corner molding 26. Thus, the leap seal portion 50k spans and eliminates a gap between the window molding 26 and the one of the inboard lip 50b and the inboard glass seal portion 50g, thereby reducing any noise (such as road noise, internally-generated noise, and other noise) that would otherwise come through this gap from the interior of the door. FIG. 3 shows a portion of the vehicle door assembly in FIG. 1, showing the leap seal portion 50k in contact with a portion of the window molding 26, and also showing the contacted edge portion 26a of the window molding 26 positioned between the leap seal portion 50k and the window glass 24.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

The invention claimed is:

1. A vehicle door assembly comprising:
   a window frame;
   a window molding mounted adjacent the window frame; and
   a glass run channel mounted inside the window frame,
   wherein a gap is formed between the window frame and the window molding so as to form a passage between an interior of a vehicle door and an occupant compartment of the vehicle, and
   wherein the glass run channel includes a leap seal portion which extends from the window frame across the gap to contact the window molding so as to seal the gap.

2. The vehicle door assembly of claim 1 wherein a portion of the glass run channel is mounted in a portion of the vehicle door assembly configured to reside adjacent a vehicle C-pillar when the door assembly is mounted on a vehicle and is in a closed condition, and wherein the leap seal portion extends only along the portion of the glass run channel configured to reside adjacent the vehicle C-pillar.

3. The vehicle door assembly of claim 1 wherein the glass run channel comprises:
   a base portion;
   an inboard lip extending from the base portion to form a first wall of the channel;
   an inboard glass seal portion extending from the inboard lip; and
   the leap seal portion extending from one of the inboard lip and the inboard glass seal portion, along at least a portion of a length of the glass run channel.

4. The vehicle door assembly of claim 3 wherein the inboard lip extends from the base portion in a first direction and the entire leap seal portion extends from the one of the inboard lip and the inboard glass seal portion in a direction parallel or substantially parallel to the first direction.

5. The vehicle door assembly of claim 3 wherein the entire leap seal portion extends from the one of the inboard lip and the inboard glass seal portion in a direction parallel or substantially parallel to a plane of a piece of window glass received in the channel.

6. The vehicle door assembly of claim 3 further comprising an outboard lip extending from the base portion opposite the inboard lip so as to form a second wall of the channel opposite the first wall of the channel, and wherein the entire leap seal portion extends from the one of the inboard lip and the inboard glass seal portion in a direction parallel or substantially parallel to the outboard lip.

* * * * *